April 7, 1953  W. I. PIXLEY  2,633,752
VARIABLE PITCH V BELT SHEAVE
Filed Dec. 18, 1950  2 SHEETS—SHEET 1

William I. Pixley,
Inventor
Koenig and Pope,
Attorneys

April 7, 1953 W. I. PIXLEY 2,633,752
VARIABLE PITCH V BELT SHEAVE
Filed Dec. 18, 1950 2 SHEETS—SHEET 2
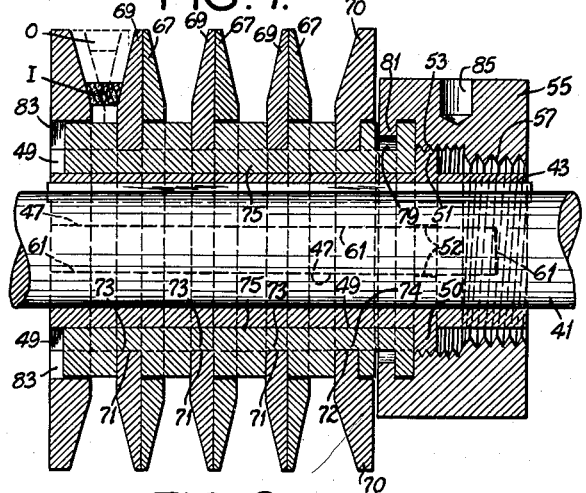
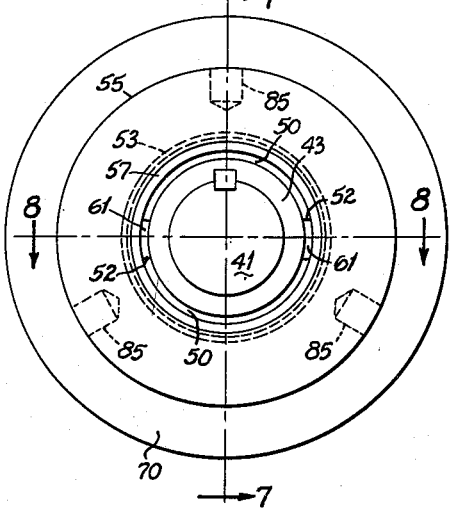
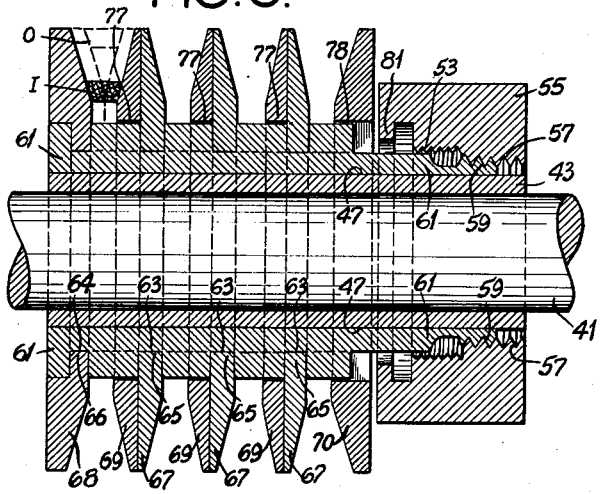
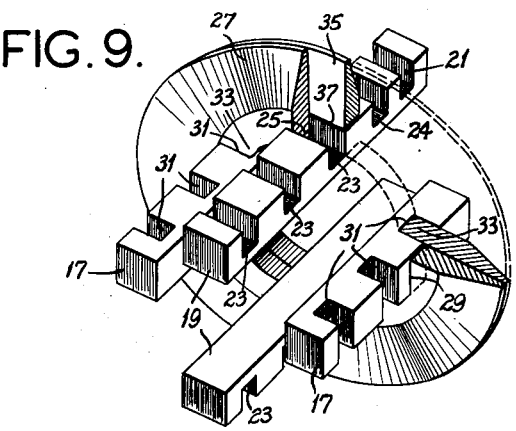
William I. Pixley,
Inventor.
Koenig and Pope,
Attorneys.

Patented Apr. 7, 1953

2,633,752

UNITED STATES PATENT OFFICE 2,633,752

VARIABLE PITCH V-BELT SHEAVE

William I. Pixley, University City, Mo.

Application December 18, 1950, Serial No. 201,272

8 Claims. (Cl. 74—230.17)

This invention relates to variable-pitch sheaves for V-belts.

Adjustable constructions are known for variable-pitch sheaves for V-belts, wherein the side cones of the sheaves are adjusted axially. By this means the V-belts may assume contact arcs of smaller diameters (when the cones are separated) or of larger diameters (when the cones are closer). Desired changes in the speed may thus be made in any drives of which the sheaves form a part.

A disadvantage of former constructions is in the large number of small parts required adjacent the hubs, particularly in cases of tandem sheaves. Not only are such parts costly to make and assemble, and their maintenance cost high, but they unduly increase the effective hub diameters of the sheaves of which they are a part.

An object of the present invention is to provide a balanced sheave of the class described which employs a very low number of parts which are simple and economical to manufacture, which are reliable and trouble-free in operation and which minimize the effective hub diameters. With the effective hub diameters reduced adjustments to smaller effective pitch diameters are possible.

Briefly, the sheave of the invention consists of a hub having two groups of keyways for two groups of relatively movable keys. There are also two groups of cones, the cones of each group having their internal peripheries engaged in notches in only one group of keys (for relative axial movements), said internal peripheries having additional notches accommodating the other group of keys (for torque transmission). Thus relative axial movements between the respective keys result in relative axial movements between the respective groups of cones. The relative movements of the cones are controlled by a nut threaded to the hub. In one form of the invention, one group of keys is stationary and the other group of keys is operated by a single-threaded nut. In the other form of the invention, the nut has one threaded connection with the hub for controlling one set of keys and a second threaded connection with the other group of keys for controlling their movements in a direction equal and opposite to the movements of the first-mentioned keys. The threads are given a differential pitch for the purpose. Other features will be in part apparent and in part pointed out hereinafter.

The invention accordingly comprises the elements and combinations of elements, features of constructions, and arrangements of parts which will be exemplified in the structures hereinafter described, and the scope of the application of which will be indicated in the following claims.

In the accompanying drawings, in which two of various possible embodiments of the invention are illustrated, Fig. 1 is a right-end view of one form of sheave constituting my invention;

Fig. 6 is a right-end view of an alternative form of the invention;

Fig. 7 is a vertical section taken on line 7—7 of Fig. 6;

Fig. 8 is a horizontal section taken on line 8—8 of Fig. 6; and

Fig. 9 is a fragmentary perspective view of two cones of the first form of the invention showing the relation of the cones to certain operating keys.

Similar reference characters indicate corresponding parts throughout the several views of the drawings.

Figure 2:
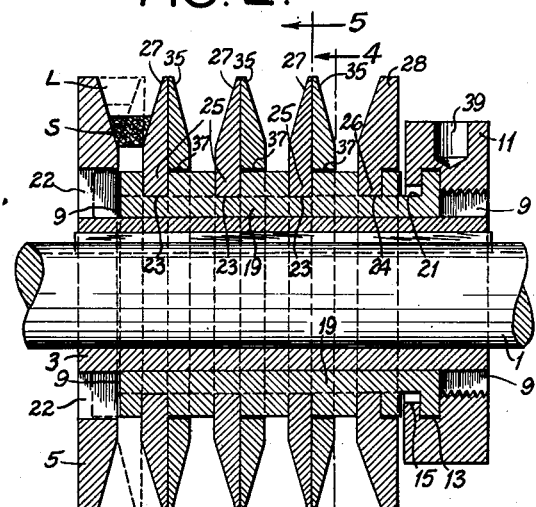
Fig. 2 is a vertical section taken on line 2—2 of Fig. 1.
Figure 3:
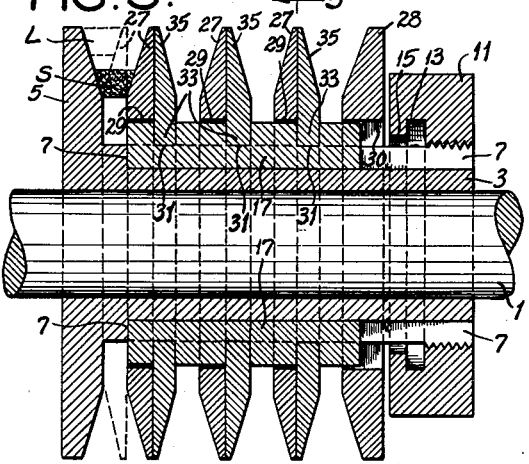
Fig. 3 is a horizontal section taken on line 3—3 of Fig. 1.
Figure 5:
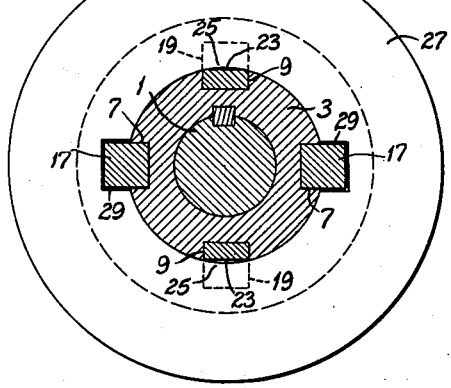
Fig. 5 is a cross section taken on line 5—5 of Fig. 2.
Figure 1:
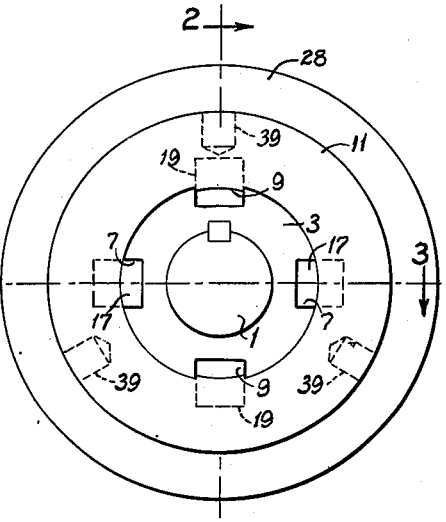
Figure 4:
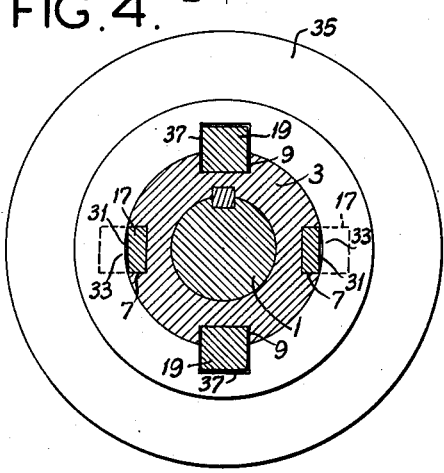
Fig. 4 is a cross section taken on line 4—4 of Fig. 2.

Referring now more particularly to Figs. 1–3, numeral 1 designates a driving or driven shaft, as the case may be, to which is keyed a hub 3, the latter including at the left a flange 5 which forms an end cone. The hub 3 is provided with two pairs of keyways 7 and 9. At its right end the hub 3 is threaded to receive a threaded adjusting nut 11, the latter having an internal groove 13 and inner flange 15.

Located in the keyways 7 are fixed keys 17, and located in the keyways 9 are adjustable sliding keys 19. The sliding keys 19 have notches 21 for reception of the inner flange 15 of the nut 11. These allow the nut to rotate with respect to the keys and move them axially as the nut is threaded on the hub 3. Openings 22 in the flange 5 admit the keys 19 for adjustment to the left (Fig. 2).

The adjustable keys 19 also have notches 23 and 24 for admitting the inside peripheries 25 and 26, respectively, of annular adjusting cones 27 and 28, respectively. The cones 27 and 28 also have notches 29 and 30, respectively (Fig. 3), which are slidingly cooperative with the fixed keys 17 to the extent that cones 27 and 28 may slide with respect to said fixed keys 17. The fixed keys 17 also have notches 31 for admitting the inner peripheries 33 of right-hand annular cones 35. Thus these cones 35 are axially fixed. These cones 35 also have notches 37 (Fig. 2), through which pass the adjustable keys 19.

At the left in Fig. 2 is shown how a belt may ride as at S on an arc of small radius or as at L on an arc of large radius, the dotted lines showing an alternate position of one of the cones 27. All the cones 27 and 28 move accordingly, so that four belts operating in tandem will form a variable-pitch tandem drive.

The adjustment for bringing about the conditions shown at the left is obtained simply by turning the nut 11, which has suitable spanner wrench sockets 39 for the purpose. When the nut 11 is threaded to the left on hub 3, the movable keys 19 are driven to the left, moving with them the cones 27 and 28, thus forcing the belt or belts into the outer position L. By threading the nut to the right, the keys 19 are driven to the right, moving with them the cones 27 and 28, thus allowing the belt or belts to move into the inner position S.

It will be understood that the threads within the adjusting nut are sufficiently tight that a given axial adjustment will be maintained after an adjustment is made. Obviously, the tightness will not be excessive because there is no torque applied to the nut under driving conditions to bias it away from any adjusted position.

In Fig. 9 the fact is clear that each cone 35 is controlled in its axial position by notches 31 in keys 17 and is in driving connection with the hub through keys 19 positioned in the cone notches 37. There is a similar condition as to cone 28 (not shown).

Conversely, cones 27 are controlled as to their axial positions by the notches 23 of keys 19 but are in driving connection with the hub through keys 17 positioned in the cone notches 29. The end cone 5 is attached to the hub directly. Thus it is clear that torque transmission and cone adjustment are effected by the keys, making a compact, simple and economical structure.

In the form of the invention shown in Figs. 1-5 and 9, described above, the belts necessarily move laterally during an adjustment, which on short center distances might be undesirable, although satisfactory on long center distances. The alternative form of the invention shown in Figs. 6-8 avoids this lateral belt shift by moving both sets of cones relative to the hub. Referring to these Figs. 6-8, numeral 41 indicates the driving or driven shaft, and 43 the hub. Hub 43 has keyways 47 and 49. The hub is also flanged as at 50 to provide external right-hand threads 51 for threading engagement with internal right-hand threads 53 in a nut 55 (Fig. 7). Keyways 47 traverse the flange 50 as shown at 52. The nut 55 is provided with a spanner wrench socket 85 for the purpose of turning it. It has additional right-hand threads 57 which have threading engagement with the threaded ends 59 of keys 61, slidable in the keyways 47 (Fig. 8). The threads 57 have a pitch twice that of threads 53. The keys 61 have notches 63 and 64 for the internal peripheries 65 and 66, respectively, of cones 67 and 68, respectively. Thus by rotating the nut 55, engagement between the double-pitch right-hand threads 57 and the threaded ends of the keys 61 causes axial adjustment in one direction of said keys. This axially adjusts the cones 67 and 68 in one direction, say in the right-hand direction.

Oppositely adjustable cones 69 and 70 have their internal peripheries 71 and 72, respectively, held in notches 73 and 74, respectively, of oppositely adjustable keys 75, which slide in the keyways 49 (Fig. 7). The cones 69 and 70 are notched, as shown at 77 and 78, respectively in Fig. 8, to accommodate relative sliding movement of the keys 61. The keys 75 are notched, as shown at 79 (Fig. 7) to receive an internal flange 81 of the nut 55. Thus when the right-hand threads 53 of the nut 55 are threaded onto the right-hand threads 51 of the hub, the keys 75 are moved axially to the left to control the axial positions of the cones 69 and 70. An opening 83 is provided in the cone 68, allowing entry of the keys 75.

Axial movements of the cones 69 and 70 on the one hand, and of cones 67 and 68 on the other hand, are opposite, as suggested by the dotted lines at the upper left in Figs. 7 and 8. This is by reason of the opposite movements of the keys 61 and 75. These opposite movements are brought about by rotation of the nut 55. Assume, for example, that this nut is rotated one turn clockwise, viewed from the left in Figs. 7 and 8. Axial movement to the left of the keys 75 is then equal to the axial movement to the left of the nut, the distance of the pitch of the threads 51 and 53, provided they are single threads. In other words, relative to the hub 43 the system 75, 69, 70 moves to the left one pitch distance. Obviously this will impart a component of motion to the left of keys 61, which, however, is more than cancelled out by relative movement of the keys 61 with respect to the nut 55 to the right equal to twice the said pitch distance, because the pitch of said threads 57 and 59 is twice that of the threads 51 and 53. Hence the net movement of the keys 61 to the right relative to hub 43 is the same as the net movement to the left of the keys 75 relative to the hub 43. Therefore, the movements of any pair of relatively movable cones are opposite and the same, thus maintaining the plane of the belt in fixed position. Note in this connection the inner and outer adjustments indicated at I and O respectively, at the upper left in Figs. 7 and 8.

From the above the advantages of the invention will be apparent. The structure is very simple, requiring no tie bolts nor spacing pillars between the cones such as used heretofore. No radial dimensions need be given over to space for such elements. Moreover, the various driving engagements consist simply of keyways in the hub, keys in these keyways and notches between the cones and the keys. These simple machine elements serve both for control of relative axial movements between the keys and for transmission of torque between the cones and the hub.

It will be understood that although the invention is shown for four belts in tandem, the structure may be adapted to other numbers of belts or to a single belt, as will be obvious. It will also be evident that instead of using two pairs of keys as described, more may be used in any number of groups, each group consisting of any number of keys. Symmetrical arrangements are preferred, however, as in the case of the two pairs of oppositely located keys shown.

As to the threads on the nut shown in Figs. 6-8, it will of course be clear that they may both be left-handed instead of both right-handed; and in fact, any suitable differential threads to provide the differential movement will be satisfactory. If multiple threads are used in either the case of the threads 53 or 57, then it will be the leads of the threads that are controlling of the relative movements rather than their pitches. For example, the threads 53 and 57 may both be of the same direction and pitch if threads 57 are double-cut.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A variable pitch multiple V-belt sheave comprising a hub having a first pair of diametrically opposite axial keyways in its exterior and a second pair of diametrically opposite axial keyways in its exterior in a plane at right angles to the plane of the first pair, a first pair of exteriorly notched keys extending axially in the first pair of keyways and a second pair of exteriorly notched keys extending axially in the second pair of keyways, means adjustable axially with respect to the hub for moving one pair of keys axially with respect to the other, end cones on the hub, and at least one pair of substantially identical intermediate cones on the hub, each intermediate cone comprising a disk having an annular conical belt-engaging surface on one face and a central opening with a pair of diametrically opposite notches at the central opening, the intermediate cones of said pair being arranged with their conical belt-engaging surfaces facing in opposite directions away from one another with one intermediate cone of the pair having its notches receiving one pair of keys and being received and keyed at its inner periphery in notches in the other pair of keys, and with the other intermediate cone of the pair having its notches receiving the other pair of keys and being received and keyed at its inner periphery in notches in the said one pair of keys.

2. A sheave as set forth in claim 1 wherein one pair of keys is fixed with respect to the hub, and the other pair is axially movable.

3. A sheave as set forth in claim 2 wherein the means for moving the movable pair of keys comprises a nut threaded on the hub and having a connection with the movable keys allowing relative rotary movement between the nut and the movable keys and effecting equal axial movement of the movable keys upon turning the nut relative to the hub.

4. A sheave as set forth in claim 1 wherein both pairs of keys are axially movable in opposite directions with respect to the hub.

5. A sheave as set forth in claim 4 wherein the means for moving the keys comprises a nut threaded on the hub and having a connection with one pair of keys allowing relative rotary movement between the nut and keys and effecting axial movement of said one pair of keys upon turning the nut relative to the hub, the nut having a threaded connection with the other pair of keys providing movement of said other pair of keys in the direction opposite to the movement of said one pair of keys.

6. A variable-pitch multiple V-belt sheave comprising a hub having a first pair of diametrically opposite axial keyways in its exterior and a second pair of diametrically opposite axial keyways in its exterior in a plane at right angles to the plane of the first pair, a first pair of exteriorly notched keys extending axially in the first pair of keyways and a second pair of exteriorly notched keys extending axially in the second pair of keyways, means adjustable axially with respect to the hub for moving one pair of keys axially with respect to the other, end cones on the hub and at least two pairs of substantially identical intermediate cones on the hub between the end cones, each intermediate cone comprising a disk having an annular conical belt-engaging surface on one face and a central opening with a pair of diametrically opposite notches at the central opening, the intermediate cones of each pair being arranged with their conical belt-engaging surfaces facing in opposite directions away from one another with one intermediate cone of the pair having its notches receiving one pair of keys and being received and keyed at its inner periphery in notches in the other pair of keys, and with the other intermediate cone of the pair having its notches receiving the other pair of keys and being received and keyed at its inner periphery in notches in the said one pair of keys, one end cone having a central opening with a pair of diametrically opposite notches at the central opening, said one end cone being keyed at its inner periphery in notches in one pair of keys and having its notches receiving the other pair of keys.

7. A variable-pitch multiple V-belt sheave comprising a hub having a first pair of diametrically opposite axial keyways in its exterior and a second pair of diametrically opposite axial keyways in its exterior in a plane at right angles to the plane of the first pair, a pair of exteriorly notched keys slidable axially in the first pair of keyways and a pair of exteriorly notched keys fixed in the second pair of keyways, means adjustable axially with respect to the hub for moving the slidable keys axially, a fixed end cone at one end of the hub, at least two pairs of substantially identical intermediate cones on the hub, each intermediate cone comprising a disk having an annular conical belt-engaging surface on one face and a central opening with a pair of diametrically opposite notches at the central opening, the intermediate cones of each pair being arranged with their conical belt-engaging surfaces facing in opposite directions away from one another with the one intermediate cone of the pair away from the fixed end cone having its notches receiving the slidable keys and being received and keyed at its inner periphery in notches in the fixed keys, and with the other intermediate cone of the pair having its notches receiving the fixed keys and being received and keyed at its inner periphery in notches in the slidable keys, and an end cone having a central opening with a pair of diametrically opposite notches at the central opening keyed at its inner periphery in notches in the sliding keys and having its notches receiving the fixed keys.

8. A variable-pitch multiple V-belt sheave comprising a hub having a first pair of diametrically opposite axial keyways in its exterior and a second pair of diametrically opposite axial keyways in its exterior in a plane at right angles to the plane of the first pair, a first pair of exteriorly notched keys slidable axially in the first pair of keyways and a second pair of exteriorly notched keys slidable axially in the second pair of keyways, means adjustable axially with respect to the hub for moving one pair of keys in opposite direction to the other, a first end cone slidable on the hub having a central opening with a pair of diametrically opposite notches at the central opening keyed at its inner periphery in notches in one pair of keys and having its notches receiving the other pair of keys, a second end cone having a central opening with a pair of diametrically opposite notches at the central opening keyed at its inner periphery in notches in the said other pair of keys and having its notches receiving said one pair of keys, and at least two pairs of substantially identical intermediate cones on the hub between the end cones, each intermediate cone comprising a disk having an annular conical belt-engaging surface on one face and a central opening with a pair of diametrically opposite notches at the central opening, the intermediate cones of each pair being arranged with their conical belt-engaging surfaces facing in opposite directions away from one another with the one intermediate cone of the pair toward said first end cone having its notches receiving said one pair of keys and being received and keyed at its inner periphery in notches in the said other pair of keys, and with the other intermediate cone of the pair having its notches receiving the said other pair of keys and being received and keyed at its inner periphery in notches in the said one pair of keys.

WILLIAM I. PIXLEY.

REFERENCES CITED

The following references are of record in the file of this patent:

UNITED STATES PATENTS

| Number | Name | Date |
| --- | --- | --- |
| 727,136 | Heermans | May 5, 1903 |
| 2,120,383 | Watson | June 14, 1938 |
| 2,183,267 | Rieser | Dec. 12, 1939 |
| 2,283,392 | Shadrick | May 19, 1942 |
| 2,400,294 | Firth | May 14, 1946 |
| 2,475,954 | Gerbing | July 12, 1949 |
| 2,475,955 | Gerbing | July 12, 1949 |